UNITED STATES PATENT OFFICE.

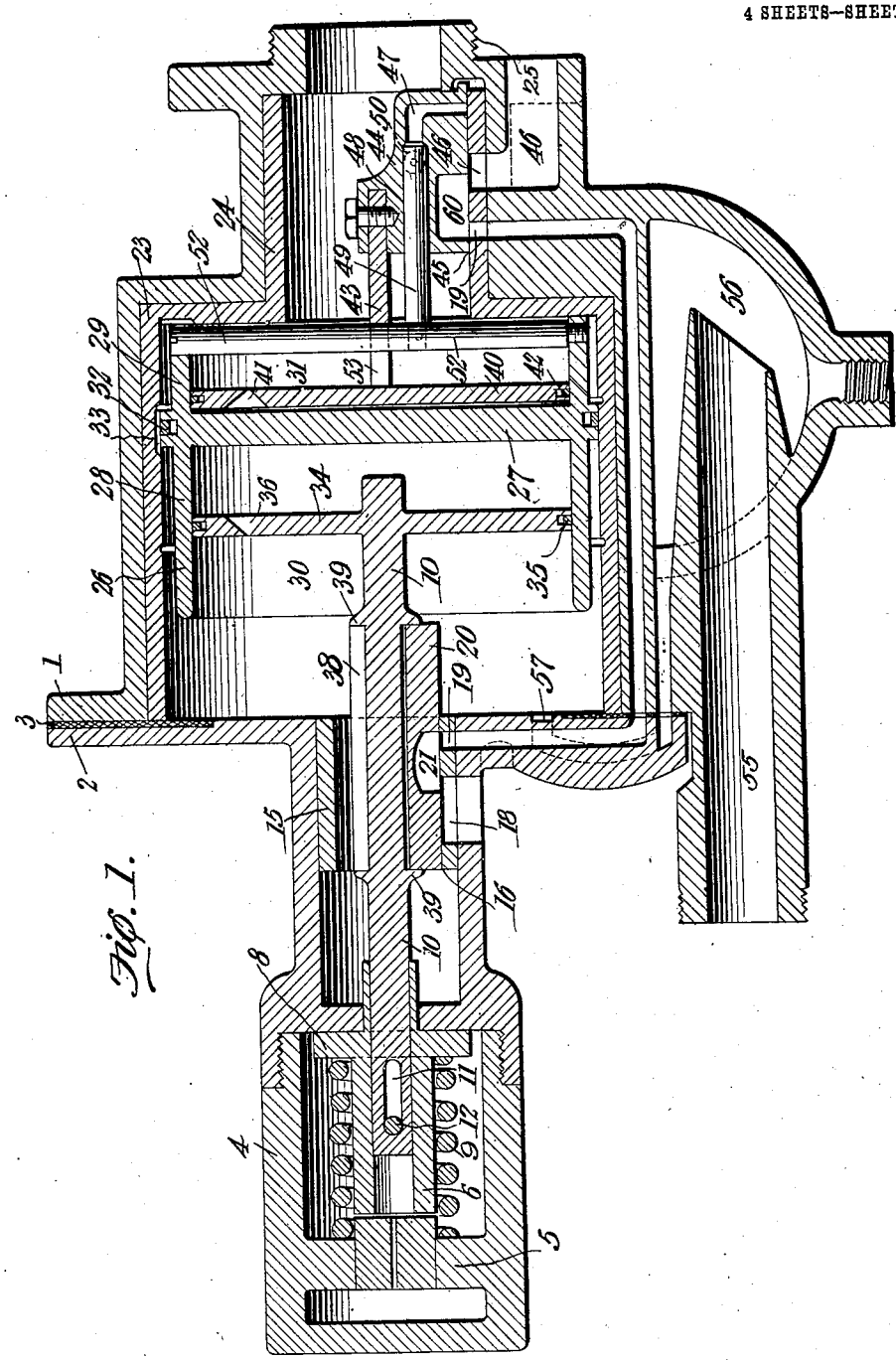

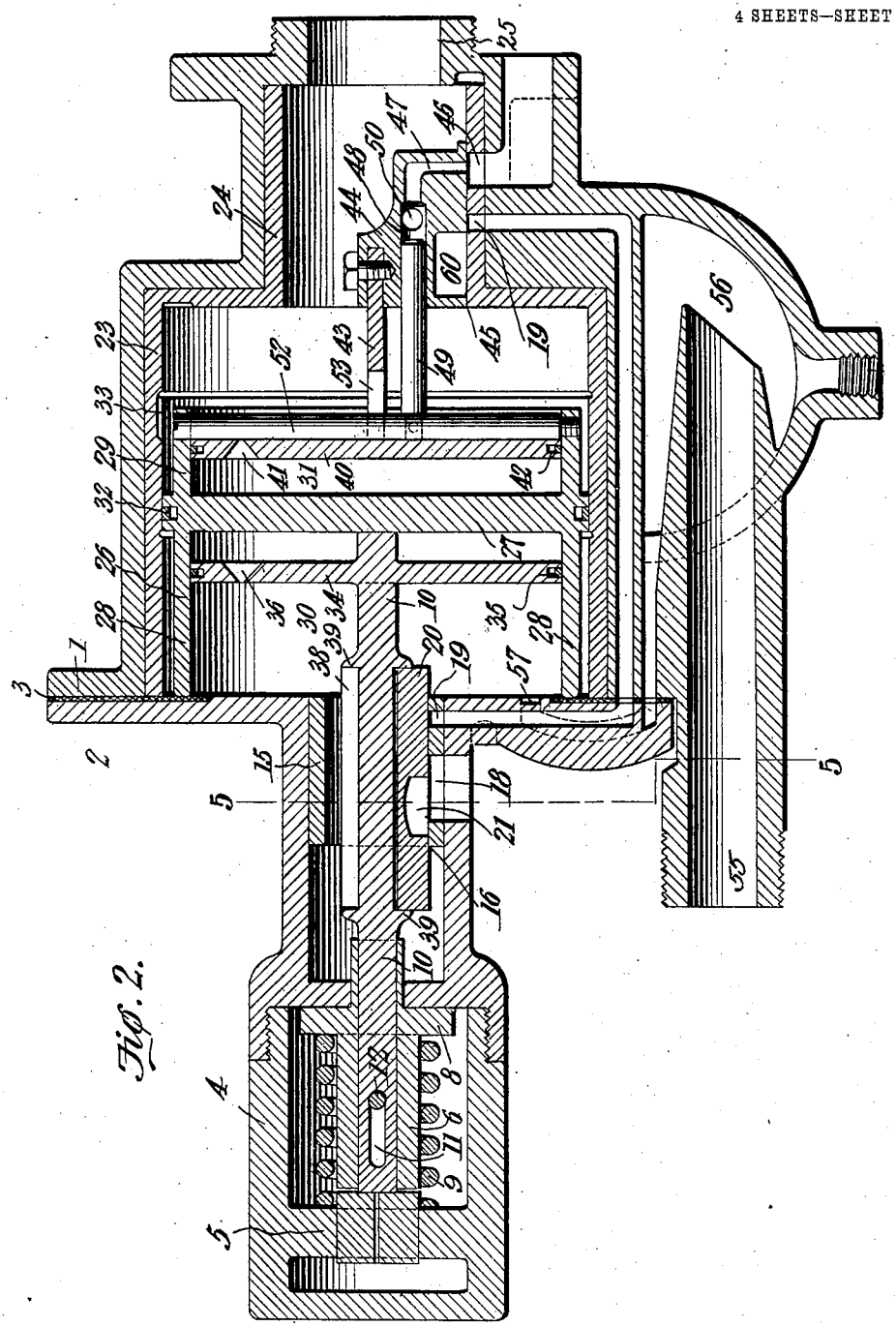

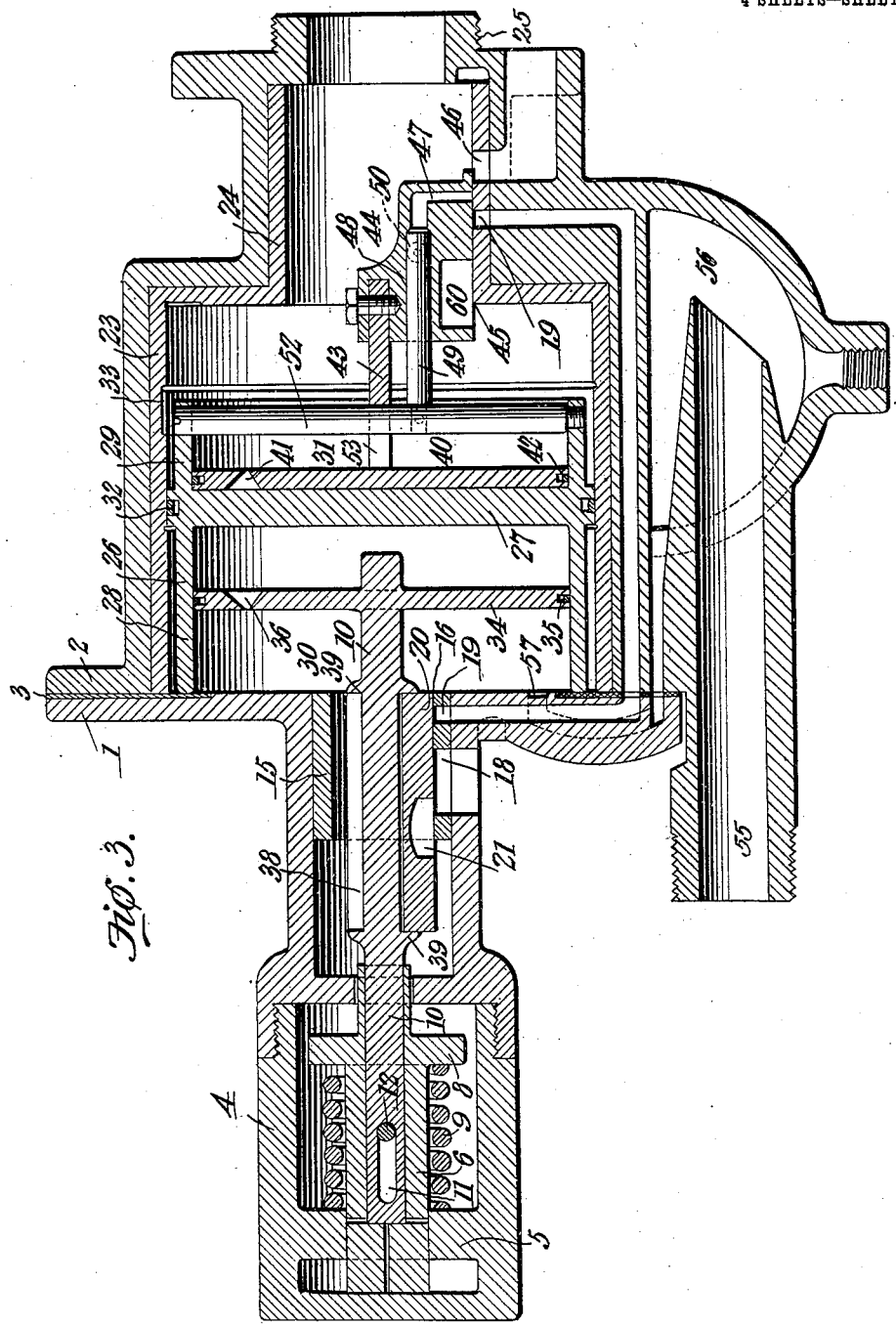

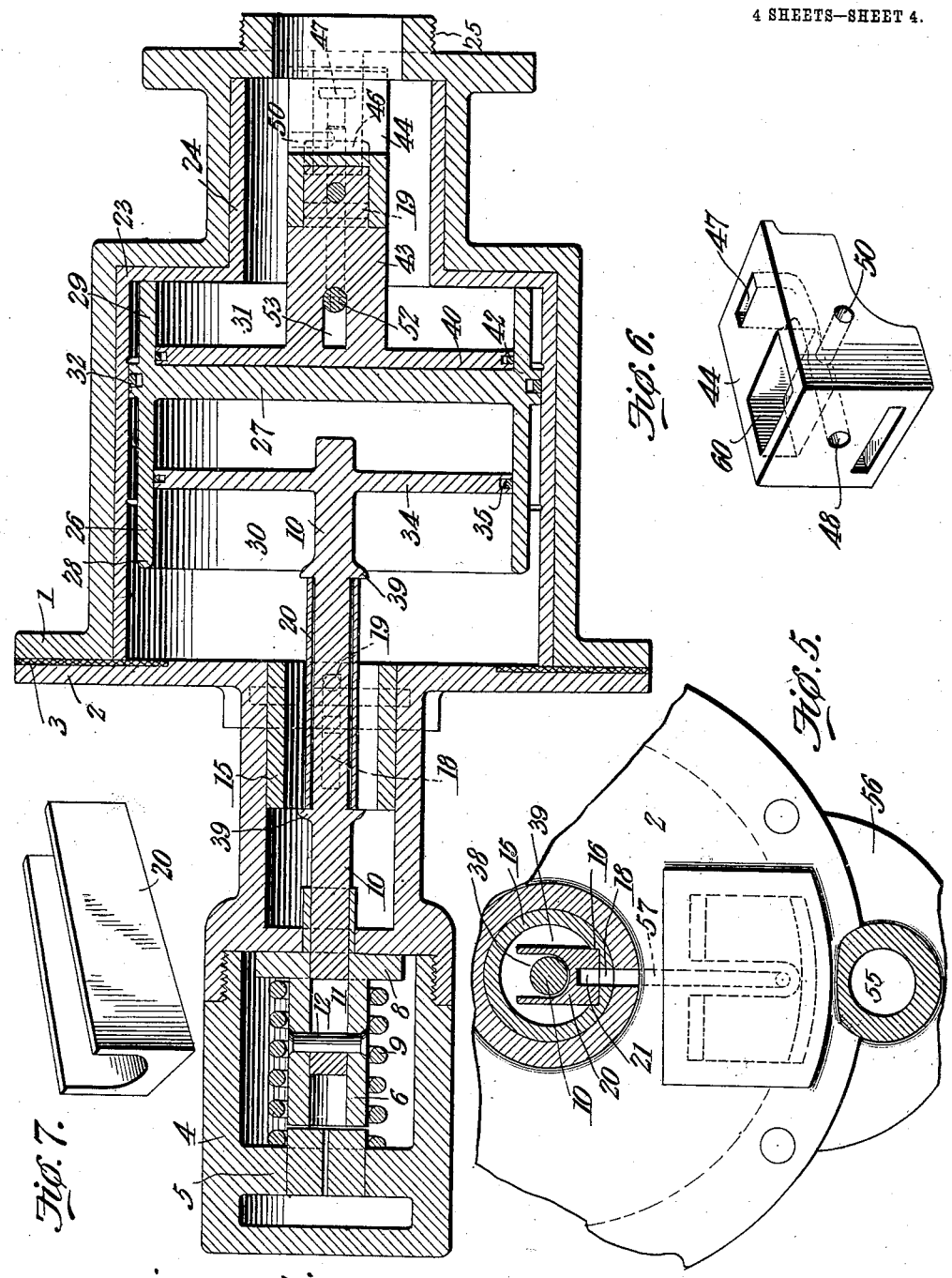

JOHN DILLANDER, OF SAN FRANCISCO, CALIFORNIA.

AIR-BRAKE MECHANISM.

No. 824,712.　　　Specification of Letters Patent.　　　Patented July 3, 1906.

Application filed July 6, 1904. Serial No. 215,482.

*To all whom it may concern:*

Be it known that I, JOHN DILLANDER, a citizen of the United States, residing at San Francisco, in the county of San Francisco and State of California, have invented a new and useful Air-Brake Mechanism, of which the following is a specification.

This invention relates to air-brake mechanism, and particularly to the construction of a triple valve.

One of the principal objects of the invention is to provide a triple valve of such construction as to permit the engineer to recharge the auxiliary reservoir while retaining in the brake-cylinder all of the air which has been allowed to flow thereinto, either from one or more graduated applications or an emergency application, so that there will be at all times sufficient air in the reservoir to permit an additional application of the brakes immediately following the release of the brakes or following an application of such brakes.

A further object of the invention is to provide a triple valve in which a quick action or emergency application may be made without danger of releasing or otherwise acting on the brakes by the surging of air through the train-pipe, as sometimes occurs during both graduated and emergency applications of the brakes on long trains.

A still further object of the invention is to provide a triple valve which during an emergency application will serve to temporarily open the train-pipe and permit the escape of a portion of the train-pipe pressure to the atmosphere, so as to effect the operation of the triple valve on the next vehicle, and this valve in turn again opening the train-pipe to effect the movement of the succeeding triple valve, this operation continuing throughout the train, the train-pipe being opened slightly so as to permit the lowering of pressure and prevent the surging of air through the train-pipe.

A still further object of the invention is to provide a triple valve in which the main piston receives movement to the same extent during both a graduated and an emergency application, while the main valve that controls the flow of air from the auxiliary reservoir to the brake-cylinder receives a movement dependent on the extent and rapidity of such reduction.

A still further object of the invention is to provide a triple valve in which the exhaust from the brake-cylinder is controlled by two separate valves, which may be moved either simultaneously or separately in accordance with circumstances.

A still further object of the invention is to provide a triple valve including a single valve member which serves to reduce the train-pipe pressure during an emergency application and serves also to retain the air in the brake-cylinder during recharging of the auxiliary reservoir, and further serves to control the exhaust from said auxiliary reservoir.

A still further object of the invention is to provide a triple valve of such construction that all of the brakes on the train may be connected to a single pipe and under the control of a single man, so that it will be unnecessary even on the longest train for the conductor or rear brakeman to assist the engineer in the application of the brakes.

A still further object of the invention is to provide a triple valve having a triplicate piston, one of the members of which forms a support and guide for the others, and all of which may be moved simultaneously or independently in accordance with the result to be accomplished.

With these and other objects in view, as will more fully hereinafter appear, the invention consists in the novel construction and arrangement of parts, hereinafter fully described, illustrated in the accompanying drawings, and particularly pointed out in the appended claims, it being understood that various changes in the form, proportions, size, and minor details of the structure may be made without departing from the spirit or sacrificing any of the advantages of the invention.

In the accompanying drawings, Figure 1 is a longitudinal sectional elevation of a triple valve constructed in accordance with the invention, the parts being shown in normal position—that is to say, with the auxiliary reservoir charged and the brake-cylinder empty and open to the outer air and the air from the train-pipe passing through the feed-groove around the piston to the auxiliary reservoir. Fig. 2 is a similar view with the parts of the piston stopped in position for a graduated application, the air equalizing from the auxiliary reservoir through the graduating-port to the brake-cylinder and the escape-port from the latter being closed. Fig. 3 is a view similar to Figs. 1 and 2, showing the parts in the position to which they moved during an emergency application—that is to say, with the main valve fully open and the air rapidly equalizing from the auxiliary reservoir to the brake-cylinder and the train-pipe pressure exhausting to the outer air, so as to reduce such train-pipe pressure and permit the application of the brake on the next car. Fig. 4 is a sectional plan view of the valve. Fig. 5 is a transverse sectional elevation of a portion of the same on the line 5 5 of Fig. 2. Fig. 6 is a detail perspective view of the main valve inverted. Fig. 7 is a detail perspective view of the combined pressure retaining and exhaust valve.

Similar numerals of reference are employed to indicate corresponding parts throughout the several figures of the drawings.

The main casing of the valve is formed of two sections 1 and 2, provided with suitable bolting-flanges, a packing 3, of leather or other suitable material, being placed between the flanges and a portion of the leather projecting within the casing, so as to form a cushioned stop for the main piston at the end of its outward stroke. To the outer end of the section 2 is secured a hollow cap 4, having a partition 5, that is provided with a guiding-opening for a hollow plunger 6, the opposite end of said plunger being loosely guided in a similar opening formed in a partition at the outer end of the section 2 of the casing. The hollow plunger has near one end an enlarged flange or collar 8, and between this collar and the partition 5 is a helical compression-spring 9, normally tending to hold the flange 8 against the section 2 of the casing.

Within the hollow plunger is guided a stem 10, having an elongated slot 11, through which passes a rivet or bolt 12, that is firmly secured to the plunger, the slot permitting of a considerable range of movement of the stem 10 without effecting corresponding movement of said plunger.

Near the inner end of the section 2 of the casing is a bushing 15, slightly recessed in order to form a valve-seat 16, and in said valve-seat are cut two ports 18 and 19, the port 18 leading through the casing to the outer air and the port 19 being in communication in the manner hereinafter described with the brake-cylinder when it becomes necessary to exhaust the air in said cylinder. On this valve-seat is mounted a combined escape and retaining valve 20, having a port 21, which may be moved to place the ports 18 and 19 in communication, as shown in Fig. 1, or it may be moved over the port 18, as shown in Fig. 2, or may be moved partly beyond the end of the valve-seat in order to place the interior of the valve-casing in communication with the outer air, and thus permit reduction of the train-pipe pressure during an emergency application.

The section 1 of the main casing has a bushing 23, a reduced portion of which, 24, extends into a contracted portion of the main casing adjacent to the auxiliary-reservoir connection 25.

Within the bushing 23 is guided an equalizing-piston 26, including a central partition 27 and a pair of annular flanges 28 29, that form, respectively, cylinders 30 and 31 on opposite sides of the partition 27. The flanges 28 and 29 are of smaller diameter than the body of the piston, that portion of the latter which is in frictional contact with the bushing 23 being approximately the width of the partition 27, and this portion of the piston is provided with an annular groove for the reception of a packing-ring 32. When in one position—the position shown in Fig. 1—the contact-face of the piston is in alinement with a feed-groove 33 and air is free to pass through said feed-groove to the auxiliary reservoir. In all other positions the piston wholly fills in the cross-sectional area of the bore of the bushing and prevents the passage of air to said reservoir.

In the cylinder 30 is mounted a piston 34, having a peripheral packing-ring 35, and this piston is rigidly secured to the stem 10, and the inner end of the stem projects some distance inward from the face of the piston 34 and is at times engaged by the partition 27 in order to prevent the piston coming into direct contact therewith. The piston 34 has an opening 36 of very small area through which air may equalize in the manner hereinafter described.

The reduced portion of the stem fits within a longitudinal groove 38, formed in the upper face of the valve, and at the opposite ends of the valve the stem 10 is provided with enlarged collars or flanges 39, which prevent any independent longitudinal movement of said valve, although the connection between the stem and the valve is such as to permit some slight vertical play of the valve in order that the air-pressure may keep the valve to its seat, the rigid fastening of the valve and stem at this point necessitating the greatest accuracy in the fitting of the parts and entailing considerable unnecessary expense.

In the cylinder 31 is arranged a piston 40, having a small port 41, through which air may equalize, and the periphery of said piston has a packing-ring 42. From the rear face of the piston 40 extends a rectangular piston rod or stem 43, that is rigidly secured to a main valve 44, sliding on a valve-seat 45, formed in the portion 24 of the bushing, and in this valve-seat are two ports 19 and 46, the port 19 being in continuance of the similar port leading to the valve-seat for the escape-valve 20 and the port 46 leading direct to the brake-cylinder.

In the main valve 44 is a graduated port 47, communicating with a graduating-valve chamber 48, said valve-chamber having a seat for an approximately cylindrical graduating-valve 49, and at a point slightly beyond the seat is an inlet-port 50, through which air may pass to the port 47 when the graduating-valve is open. The graduating-valve is held by a graduated pin 52, that extends diametrically across the cylinder 31 and is connected to the flange 29, which forms said cylinder, and this graduated pin extends through an elongated slot 53, formed in the flat or rectangular valve-stem 43.

The train-pipe is coupled at 55 and air passes inward from thence to a chamber 56 and port 57 to the main chamber of the valve and tends to force the piston to the right until the feed-groove is open and air allowed to pass through the feed-groove to the auxiliary reservoir.

Under normal conditions the parts are in the position shown in Fig. 1, the auxiliary reservoir being filled with air and air from the train-pipe passing through the feed-groove to said auxiliary reservoir, while the engineer's brake-valve is at the feed position. The brake-cylinder is empty and the combined retaining and escape valve 20 places the exhaust-port 19 of the brake-cylinder in communication with the port 18, leading to the outer air. At this time air is equalizing through the port 36 to the interior of the cylinder 30 and through the port 41 to the cylinder 31, so that the pressure is equalized throughout the whole apparatus. To apply the brakes gently, the engineer reduces the train-pipe pressure by the ordinary engineer's brake-valve, the reduction being, say, to the extent of five or seven pounds. The air then passes from the left side of piston 26—that is, from cylinder 30 through port 36 to the train-pipe—while the piston 34 is held by the frictional resistance of the combined retaining and exhaust valve 20. The air thus passes slowly from the left side of the casing out through the port 57 and chamber 56 to the train-pipe, and thence escapes by way of the engineer's brake-valve. The storage-reservoir pressure now expands into the main valve-chamber through the port 41 into the cylinder 31, acting on the piston 26 and forcing it to the left, while the frictional resistance of the main admission-valve 44 keeps the piston 40 in initial position. The piston 26 moves gradually to the left, and the graduating-valve is opened, so that air is free to pass through port 50 to graduating-port 47. As the movement continues, the graduating-pin 52 engages the outer face of the piston 40 at the end of the slot 53, and further movement now carries both the piston 27 and 40 to the left, together with the main admission-valve and the graduating-valve, the latter still retaining the open position. The port 60 of the valve 44 then disconnects the ports 19 and 46, and the end of the flange 28 of the main piston seats itself against the packing 3 just as the graduating-port registers with the port 46, and as the graduating-valve is open air passes through the valve and port 46 to the brake-cylinder. During the movement of the piston 26 to the left, the partition 27 came into contact with the shorter end of the stem 10 or that end which projects within the cylinder 30, and moved said stem to the left together with the exhaust-piston 34, the movement being sufficient to force the combined retaining and exhaust valve 20 to a position where the port 19 was covered by the valve 20, and further movement carries the port 21 of said valve nearly to the end of its seat. At the same time the stem 10 moves until the right-hand end of the slot 11 engages the pin 12 and the end of the stem makes contact with the bottom of the bore of the hollow plunger. This position of the parts is shown in Fig. 2 and is that to which the parts are moved for a graduated application. With the parts in the position shown in Fig. 2 air continues to flow from the auxiliary reservoir through the ports 50, 47, and 46 to the brake-cylinders until the storage-reservoir pressure is slightly below the train-pipe pressure, and then piston 26 moves to the right under the superior train-pipe pressure, setting the graduating-valve 49 and stopping the flow of air to the brake-cylinder. The difference of pressure is not sufficient to move the piston 26 any farther after the graduating-valve is set, on account of the frictional resistance of the main admission-valve 44, and if the brakes are to be applied harder another reduction of train-pipe pressure is made in order to move the graduating-valve to open position, and this may be accomplished repeatedly and as often as necessary.

In order to release the brakes, the engineer suddenly turns his brake-valve to release position and the pressure in the train-pipe is suddenly raised, overcoming the auxiliary-reservoir pressure and restoring all of the parts to the position shown in Fig. 1, permitting the air to escape from the brake-cylinder through the ports 46, 60, 19, 21, and 18 to the outer air.

If the engineer desires to recharge the auxiliary reservoir and at the same time retain pressure in the brake-cylinder, he moves the engineer's brake-valve to the feed position instead of to the release position, and air admitted to the train-pipe feeds through the several ports to the valve-casing and gradually equalizes through the port 36 of piston 34, acting on the partition 27 and forcing the piston 26 with all of its attached parts to the right, the movement continuing until the feed-groove 33 is uncovered, the graduating-valve being now closed. During this movement the frictional resistance of the combined retaining and exhaust valve 20 holds it stationary and the piston 24 remains in the position to which it was moved by the graduated application, while air feeds gradually and slowly through the feed-groove 33 to the auxiliary reservoir and also equalizes through the port 36 into the cylinder 30, and while the main admission-valve 44 is restored to the position shown in Fig. 1 and port 46 is in communication with port 19 the air cannot escape from the brake-cylinder, owing to the fact that the combined retaining and exhaust valve 20 will close the outlet end of the port 19. To release the brakes it is merely necessary for the engineer to move the brake-valve handle to quick release position and the air is forced through the train pipe faster than it can feed through the groove 33 and through the port 36, so that the piston 34 is forced to the right until the pin 12 is in engagement with the left-hand end of the slot 11, and at this point the port 21 of the combined retaining and exhaust valve is adjusted to the position shown in Fig. 1, permitting the brake-cylinder to exhaust through ports 46, 60, 19, 21, and 18 to the outer air, thus releasing the brakes. A further advantage of the invention is that while the pressure in the brake-cylinder is still retained and the auxiliary reservoir being recharged the engineer may make a second application, if necessary, by reducing the train-pipe pressure. It will be remembered that during the recharging operation the engineer's brake-valve is merely in feed position, so that the train-pipe is not overcharged, and the relation of the parts is also exactly the same as though the valve members were in the position shown in Fig. 1 with the train-pipe pressure equalizing through the feed-groove 33. The slight reduction necessary for a graduated application is then made, and the same movement occurs as before described, so that the recharging operation will not in any way interfere with a second application at any time. In an emergency application where the ordinary triple valve is employed all of the air exhausted from the train-pipe passes through the engineer's brake-valve in practically the same manner as for the graduated application, but the discharge occurs more quickly. In a long train the sudden reduction of pressure at the front end of the train-pipe will immediately set the brakes at the front of the train, and then as the air surges forward from the rear end of the train-pipe the pressure is at times sufficient to release the front brakes, as stated. This results in considerable damage in the ordinary system, often leading to the parting of the train, as well as severe strain due to sudden application of the brakes and the unequal application at different points in said train. In carrying out the present invention provision is made for preventing any such surging of the air in the train-pipe and for positively insuring a practically instantaneous application of all of the brakes throughout the whole length of the train, this being accomplished by allowing a portion of the train-pipe pressure to exhaust to the open air at each of the triple valves and insuring the action throughout the train, opening of the train-pipe of the first valve, quickly reducing the pressure, so that the valve of the next car is operated, and the opening movement of the train-pipe of the second car insuring similar movement of the valve of the third car, and so on throughout the whole of the train.

To make an emergency application of the brakes, the engineer's brake-valve is moved to the emergency-stop and the train-pipe pressure is rapidly reduced. The air exhausts so rapidly from the left end of the triple-valve chamber that the pressure in the cylinder 31 cannot equalize through the port 41 and the pressure in the cylinder 30 cannot equalize through port 36, so that the three piston members 26, 34, and 40 move to the left as one member, and the main admission-valve 44 in this case travels a distance equal to that traveled by the piston 26, and this movement of the valve causes it to pass clear over the port 46, allowing the auxiliary-reservoir pressure to instantly equalize with the brake-cylinder. As all of the parts move to the left as one solid piece, the air in the cylinder 30 is caught between the partition 27 and piston 34, so that the partition does not strike the inwardly-projecting end of the stem 10, and this causes the combined retaining and exhaust valve 20 to move to the left until the port 21 of said valve is slightly beyond the end of its seat, and train-pipe pressure now reduces outward through the chamber 56, port 57, and the left end of the triple-valve casing to port 21 and down through port 18 to the atmosphere. This reduces the train-pipe pressure to an extent sufficient to start the triple valve on the next car, and so on throughout the train, the parts standing in the position shown in Fig. 3. This movement of the piston is sufficient to move the end of the stem 10 into engagement with the bottom of the bore of plunger 6 and the right-hand of the slot 11 into engagement with the pin 12, thus compressing the spring 9. The spring 9 in expanding forces the stem to the right, and the air confined in the cylinder 30 is equalized through the port 36 into the main chamber, allowing the piston 34, the stem 10, valve 20, and plunger 6 to move to the right until the flange 8 of the plunger seats against the end of the section 2 of the casing, and at this time the port 21 of the valve 20 will have passed beyond the end of the valve-seat and the flow of air through the port 18 will be cut off. In order to release the brakes, the train-pipe is suddenly recharged by movement of the engineer's brake-valve to release position, and the several parts are again restored to the position shown in Fig. 1, permitting the brake-cylinder to exhaust to the atmosphere.

Should the engineer desire to recharge the auxiliary reservoir immediately after an emergency application and while the pressure is still retained in the brake-cylinder, the engineer's brake-valve is moved to the feed position and the air entering slowly through the train-pipe equalizes through the port 36 and acts on the partition 27 in the manner previously described, the main admission-valve being moved to its initial position, while the valve 20 is retained in the position shown in Fig. 2. To release the brakes after such recharging with the retention of pressure in the brake-cylinder, the engineer's brake-valve is moved to full-release position, and the sudden increase in pressure in the train-pipe moves the piston 34 to the right and brings the valve 20 to the position shown in Fig. 1, permitting the brake-cylinder to exhaust to the atmosphere.

In the construction of the device all of the ports are made large enough to permit almost instant equalization of the pressure between the auxiliary reservoir and the brake-cylinder, and all of the pistons are of sufficient area to quickly respond to small variations of pressure and to move all of the slide-valves instantly.

Having thus described the invention, what is claimed is—

1. In air-brake mechanism, a main valve, a graduating-valve, and independent pistons for moving said valves successively on a graduated application, and simultaneously through the entire stroke on an emergency application.

2. In a triple valve, a main piston having a uniform stroke for both graduated and emergency applications, a second piston carried by the first and exposed to auxiliary-reservoir pressure, said second piston having an equalizing-port, a main inlet-valve connected to the second piston, and a graduating-valve carried by the main piston.

3. In triple-valve mechanism, a main piston having a cylinder, a second piston mounted in the cylinder and having an equalizing-port, said piston being exposed to auxiliary-reservoir pressure, a main inlet-valve connected to the second piston, and a graduating-valve carried by the main piston.

4. In air-brake mechanisms, a main valve, a graduating-valve, and a pair of telescopic pistons having independent connection with said valves, said pistons being simultaneously operable through the entire stroke on an emergency reduction.

5. In air-brake mechanism, a main valve, a graduating-valve, and a pair of pistons connected, respectively, to the valves, said pistons being movable successively on the service application and simultaneously through the entire stroke on an emergency application.

6. In air-brake mechanism, a main valve, a graduating-valve, a pair of pistons having substantially rigid connection with the valves and both being simultaneously movable through the entire stroke on an emergency reduction to impart to the valves the full stroke of the pistons.

7. In air-brake mechanism, a main valve, a graduating-valve, a graduating-valve-operating piston having a uniform stroke on all train-pipe reductions, a main-valve-operating piston having a variable stroke, the graduating-valve piston being movable independently of the main-valve piston for a portion of its stroke on a service reduction and movable simultaneously therewith during the remaining portion of the stroke, both pistons being simultaneously movable throughout the full stroke on an emergency reduction.

8. In air-brake mechanism, a main valve, a graduating-valve, a piston connected to the graduating-valve, and containing a cylinder, and a second piston mounted within the cylinder and having a rigid connection with the main valve, the valve and piston having equal movement.

9. In air-brake mechanisms, a main valve, a graduating-valve, a main piston connected to the graduating-valve and containing a cylinder, a second piston arranged within the cylinder and connected to the main valve, the second piston having a port for the admission of air to said cylinder.

10. In air-brake mechanisms, a main valve, a graduating-valve, a main piston connected to the graduating-valve and containing a cylinder, a second ported piston arranged in said cylinder, means for connecting the second piston to the main valve, and means for limiting independent movement of said second piston.

11. In air-brake mechanisms, a main valve, a graduating-valve, a main piston connected to the graduating-valve, a cylinder arranged within said piston, a ported piston arranged within the cylinder, a slotted yoke connecting the ported piston to the main valve, and a bar carried by the main piston and extending through said slotted yoke.

12. In triple-valve mechanism, a plural-piston construction including a main piston provided on each of its sides with a cylinder, auxiliary pistons disposed in said cylinders, valves to which all of the pistons are connected, the piston members being movable both independently and simultaneously.

13. In a triple-valve mechanism, a main piston having a cylinder, a second piston mounted in said cylinder and provided with a contracted equalizing-port, a main valve secured to the second piston, and a graduating-valve carried by the main piston, said pistons and valves moving simultaneously under sudden reduction of train-pipe pressure, graduated reduction of such pressure permitting the equalization of pressure through the port of the second piston and resulting in preliminary independent movement of the main piston.

14. In a triple-valve mechanism, a main piston having a pair of cylinders, pistons disposed in said cylinders, and a plurality of controlling-valves connected to the several pistons, each of said pistons being movable simultaneously or singly in accordance with the quickness of variations of train-pipe pressure.

15. In a triple valve, a main piston having a plurality of cylinders, secondary pistons mounted in the cylinders and provided with equalizing-ports, and a controlling-valve connected to each of the pistons, said pistons being responsive singly or simultaneously to the variations of train-pipe pressure in accordance with the speed at which the increase or reduction of pressure is accomplished.

16. In triple-valve mechanism, a ported casing, a valve-operating means, and a valve having a single port or cavity, said valve being movable to present the port to three positions thereby, one, to place the train-pipe end of the casing in communication with the exhaust to the atmosphere; a second, to place the brake-cylinder port in communication with the exhaust, and a third to blank the brake-cylinder port.

17. In air-brake mechanism, a main valve, a graduating-valve, a train-pipe-opening valve, a main piston connected to the graduating-valve and provided with a pair of cylinders, and pistons disposed in said cylinders, the pistons being connected respectively with the graduating-valve and the train-pipe-opening valve.

18. In a triple valve, a main piston having a cylinder, a second piston arranged within the cylinder and provided with an equalizing-port, a valve connected to the second piston and serving to control communication between the train-pipe end of the triple-valve casing and the atmosphere, a main inlet-valve operable by the main piston, and means for restoring the exhaust-valve to closed position independently of the movement of the main piston.

19. In a triple valve, a casing, a main equalizing-piston mounted therein and having a uniform stroke, a pair of cylinders carried by the piston, auxiliary pistons arranged in said cylinders and provided with equalizing-ports, a main admission-valve connected to one of said auxiliary pistons, a graduating-valve connected to the main piston and coacting with the main valve, and a combined pressure retaining and exhaust valve connected to the second of the auxiliary pistons.

20. The combination in a triple valve, of a casing, a main piston mounted therein, and having a uniform stroke, a pair of cylinders carried by said piston, auxiliary pistons mounted within the cylinders and provided with equalizing-ports, a main valve connected to one of the auxiliary pistons, a graduating-valve connected to the main piston, an exhaust-port leading from the brake-cylinder, a combined pressure retaining and exhaust valve controlling said port, and means connecting said valve to the second auxiliary piston.

21. In a triple valve, a casing, a main piston mounted within the casing and provided with a pair of cylinders, auxiliary pistons mounted within said cylinders and each provided with an equalizing-port, a main valve connected to one of the auxiliary pistons, a graduating-valve connected to the main piston, and a valve connected to the second auxiliary piston, said valve controlling the passage from the brake-cylinder and the flow of air from the train-pipe end of the triple valve to the atmosphere.

22. The combination in a triple valve, of a casing, a main piston arranged therein and having a uniform stroke under both graduated and emergency reductions, a cylinder carried by said piston, an auxiliary piston mounted within the cylinder and having an equalizing-port, a main valve having a graduating-port, a slotted stem connecting such valve to the secondary piston, a transverse bar secured to the main piston and extending through the slotted stem, and a graduating-valve secured to said bar and controlling the graduating-port.

23. The combination in a triple valve, of a casing, a main piston mounted therein and having uniform stroke for both graduated and emergency applications, a cylinder carried by said piston, a second piston mounted within said cylinder, a cross-bar carried by the main piston and limiting independent play of the secondary piston, a main valve having a graduating-port, a stem connecting the valve to the secondary piston and provided with a slot for the reception of such bar, and a graduating-valve connected to said bar and controlling the graduating-port.

24. The combination in a triple valve, of a pair of movable pistons, of which one is mounted within the other, the inner of said pistons having an equalizing-port of contracted area, and a main valve and a graduating-valve to which said pistons are respectively connected, the area of the equalizing-port being insufficient to permit the pressure to equalize through said port on sudden reduction of train-pipe pressure.

25. In a triple valve, a casing, a piston mounted therein and provided with a cylinder, an auxiliary piston mounted in the cylinder and provided with an equalizing-port, a combined pressure retaining and exhaust volve connected to the secondary piston, the area of the equalizing-port being insufficient to permit equalization of the pressure through said port on sudden reduction of train-pipe pressure.

26. In a triple valve, a casing, a main piston mounted therein and provided on its opposite sides with cylinders, a pair of auxiliary pistons mounted in said cylinders and provided with equalizing-ports of contracted area, a main valve connected to one of said auxiliary pistons, a graduating-valve connected to the main piston, a valve-stem connected to the second of the auxiliary pistons, a combined pressure retaining and exhaust valve under the control of said stem, a hollow plunger receiving the end of said stem, and a spring acting on said plunger and tending to force the stem inward to effect closing movement of the valve to which said stem is connected.

In testimony that I claim the foregoing as my own I have hereto affixed my signature in the presence of two witnesses.

JOHN DILLANDER.

Witnesses:
W. H. LOWE,
G. J. PICKETT.